(12) United States Patent
Harris et al.

(10) Patent No.: US 11,132,420 B2
(45) Date of Patent: *Sep. 28, 2021

(54) UTILIZING SERVER PRE-PROCESSING TO DEPLOY RENDITIONS OF ELECTRONIC DOCUMENTS IN A COMPUTER NETWORK

(71) Applicant: Microsoft Technology Licensing, LLC, Redmond, WA (US)

(72) Inventors: Vanessa Harris, Bothell, WA (US); Christopher J. Brown, Redmond, WA (US); Sugandha S. Kapoor, Redmond, WA (US); Donovan P. Lange, Seattle, WA (US); Zhenjun Zhu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/245,020

(22) Filed: Jan. 10, 2019

(65) Prior Publication Data

US 2019/0147007 A1    May 16, 2019

Related U.S. Application Data

(63) Continuation of application No. 12/477,460, filed on Jun. 3, 2009, now Pat. No. 10,198,523.

(51) Int. Cl.
*G06F 16/958*    (2019.01)
(52) U.S. Cl.
CPC .................. *G06F 16/958* (2019.01)
(58) Field of Classification Search
CPC .................................................. G06F 16/958
See application file for complete search history.

(56) References Cited

U.S. PATENT DOCUMENTS 5,870,552 A * 2/1999 Dozier ............... G06F 16/10
709/219
7,139,812 B2   11/2006 Dozier et al.
(Continued)

FOREIGN PATENT DOCUMENTS

JP    2004021529 A    1/2004
KR    20050109847 A   11/2005

OTHER PUBLICATIONS

"Office Action Issued in Brazilian Patent Application No. PI 1012086-6", dated Aug. 14, 2019, 5 Pages.
(Continued)

*Primary Examiner* — Stephen S Hong
*Assistant Examiner* — Nicholas Hasty
(74) *Attorney, Agent, or Firm* — Merchant & Gould P.C.

(57) ABSTRACT

Embodiments are provided for utilizing server pre-processing to deploy static renditions of electronic documents in a computer network. An electronic document may be published from a client computer to a first server computer in the computer network. During publication, the first server computer may create a static rendition of the electronic document and a viewing application for viewing the static rendition of the electronic document on the client computer. The first server computer may store the static rendition of the electronic document and the viewing application on a second server computer for delivery to the client computer. Other embodiments may also include receiving, at the first server computer, a request to make revisions to the electronic document and sending a dynamic version of the electronic document from the first server computer to the client for making the revisions to the electronic document.

20 Claims, 5 Drawing Sheets

(56) References Cited

U.S. PATENT DOCUMENTS

| | | | | |
|---|---|---|---|---|
| 7,562,287 | B1* | 7/2009 | Goldstein | G06Q 30/02 |
| | | | | 715/201 |
| 8,595,635 | B2* | 11/2013 | Krzanowski | G06F 21/33 |
| | | | | 715/760 |
| 2002/0032693 | A1 | 3/2002 | Chiou et al. | |
| 2002/0194302 | A1 | 12/2002 | Blumberg | |
| 2003/0196171 | A1 | 10/2003 | Distefano, III | |
| 2006/0106822 | A1 | 5/2006 | Lee et al. | |
| 2006/0242572 | A1* | 10/2006 | Grantham | G06F 9/44526 |
| | | | | 715/234 |
| 2007/0061698 | A1 | 3/2007 | Megiddo et al. | |
| 2008/0189284 | A1* | 8/2008 | Vanasco | G06F 21/10 |
| 2009/0019379 | A1* | 1/2009 | Pendergast | G06F 16/93 |
| | | | | 715/762 |

OTHER PUBLICATIONS

"Office Action Issued in Indian Patent Application No. 09413/DELNP/2011", dated Apr. 25, 2019, 06 Pages.
"Office Action Issued in European Patent Application No. 10783958.1", dated Apr. 23, 2019, 06 Pages.
"Office Action Issued in European Patent Application No. 10783958.1", dated Oct. 17, 2019, 7 Pages.
"Summons to Attend Oral Proceedings Issued in European Patent Application No. 10783958.1", dated Feb. 13, 2020, 08 Pages.

* cited by examiner

UTILIZING SERVER PRE-PROCESSING TO DEPLOY RENDITIONS OF ELECTRONIC DOCUMENTS IN A COMPUTER NETWORK

CROSS-REFERENCE TO RELATED APPLICATIONS

This application is a continuation application and claims priority to U.S. patent application Ser. No. 12/477,460, filed Jun. 3, 2009, now U.S. Pat. No. 10,198,523, issued Feb. 5, 2019, entitled "UTILIZING SERVER PRE-PROCESSING TO DEPLOY RENDITIONS OF ELECTRONIC DOCUMENTS IN A COMPUTER NETWORK,", which application is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In client-server computer networks, collaborative application programs allow electronic documents to be published from a client to one or more server computers for viewing, sharing, and embedding (e.g., in a blog or web page) by multiple users over a wide area network, such as the Internet. The demand for viewing a published electronic document may be driven to unacceptably high levels by referral traffic from websites. The referral traffic may be generated, for example, by news and social networking websites, prominent rankings of document search term by web-based search engines, or high traffic to a website which has embedded the published electronic document. When there is a high demand for published electronic documents, server computer processing which is required to display these documents is increased resulting in reduced network performance and delays in delivering electronic documents to requesting users. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for utilizing server pre-processing to deploy static renditions of electronic documents in a computer network. An electronic document may be published from a client computer to a first server computer in the computer network. During publication, the first server computer may create a static rendition of the electronic document and a viewing application for viewing the static rendition of the electronic document on the client computer. The first server computer may store the static rendition of the electronic document and the viewing application on a second server computer for delivery to the client computer. Other embodiments may also include receiving, at the first server computer, a request to make revisions to the electronic document and sending a dynamic version of the electronic document from the first server computer to the client for making the revisions to the electronic document. Other embodiments may further include the client computer creating static renditions of electronic documents. Still other embodiments may include computer systems where electronic document contents may be represented statically and replaced dynamically. In accordance with these embodiments, the static rendition of an electronic document may be quickly loaded and displayed for viewing on the client computer even while dynamic electronic document data is being downloaded in the background.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for utilizing server pre-processing to deploy static renditions of electronic documents in a computer network. An electronic document may be published from a client computer to a first server computer in the computer network. During publication, the first server computer may create a static rendition of the electronic document and a viewing application for viewing the static rendition of the electronic document on the client computer. The first server computer may store the static rendition of the electronic document and the viewing application on a second server computer for delivery to the client computer. Other embodiments may also include receiving, at the first server computer, a request to make revisions to the electronic document and sending a dynamic version of the electronic document from the first server computer to the client for making the revisions to the electronic document. Other embodiments may further include the client computer creating static renditions of electronic documents. Still other embodiments may include computer systems where electronic document contents may be represented statically and replaced dynamically. In accordance with these embodiments, the static rendition of an electronic document may be quickly loaded and displayed for viewing on the client computer even while dynamic electronic document data is being downloaded in the background.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
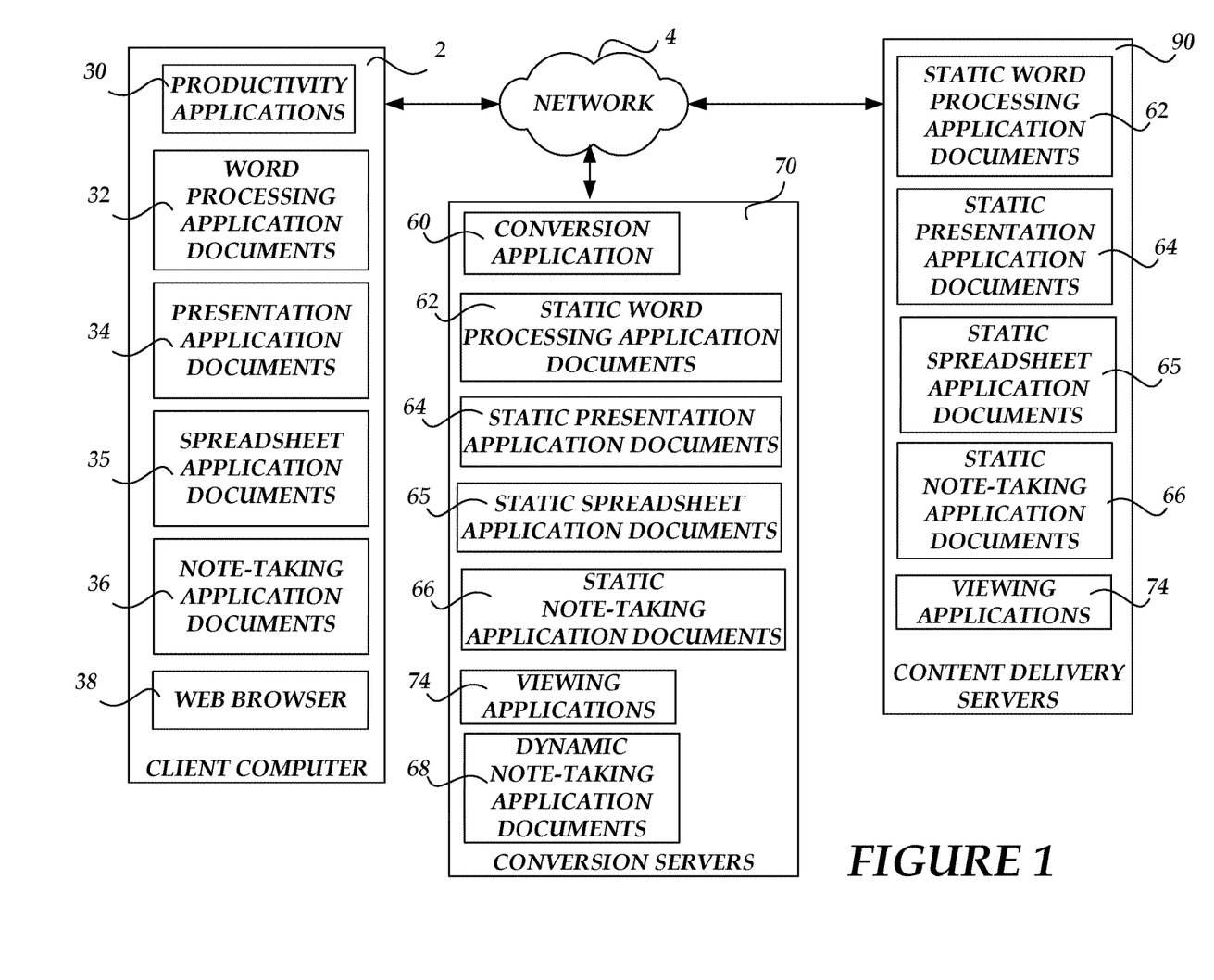
FIG. 1 is a block diagram illustrating a client-server network architecture for utilizing server pre-processing to deploy static renditions of electronic documents in a computer network, in accordance with various embodiments.

Referring now to the drawings, in which like numerals represent like elements through the several figures, various aspects of the present invention will be described. FIG. 1 is a block diagram illustrating a client-server network architecture for utilizing server pre-processing to deploy static renditions of electronic documents in a computer network, in accordance with various embodiments. The network architecture includes a client computer 2, conversion servers 70, and content delivery servers 90, which are in communication with each other over a network 4. The network 4 which may include a local network or a wide area network (e.g., the Internet).

The client computer 2 may store various productivity applications 30 which may be used to create, edit, and publish electronic documents to the conversion servers 70 for viewing and/or editing by users over the network 4. In accordance with various embodiments, the productivity applications 30 may comprise the WORD word processing software, the POWERPOINT presentation graphics program, the EXCEL spreadsheet application program, and the ONENOTE note-taking program from MICROSOFT CORPORATION of Redmond Washington. It should be appreciated that the aforementioned productivity applications 30 may comprise individual application programs or alternatively, may be incorporated into a suite of productivity applications such as the OFFICE application program suite from MICROSOFT CORPORATION. It should be appreciated, however, that other productivity/application programs from other manufacturers may be utilized in accordance with the various embodiments described herein.

As discussed above, the productivity applications 30 on the client computer 2 may be used to create, edit, and publish electronic documents. The electronic documents may include word processing application documents 32, presentation application documents 34, and note-taking application documents 36. The client computer 2 may also store a web browser 38 which, in accordance with various embodiments, may be utilized for viewing static and/or dynamic renditions of the aforementioned electronic documents as web pages.

The conversion servers 70 may include a conversion application 60. In accordance with various embodiments, the conversion application 60 may be configured to convert electronic documents during server pre-processing operations (i.e., during the publication of the electronic documents to the conversion servers 70), to create static renditions of the electronic documents including, without limitation, static word processing application documents 62, static presentation application documents 64, static spreadsheet application documents 65, and static note-taking application documents 66. As discussed herein, a "static" rendition is one in which fewer server resources are used to serve (or generate the display of) a view of an electronic document. In particular, processing which may be utilized to prepare an electronic document on one or more servers for viewing is avoided. This has the effect of making the static rendition of an electronic document uneditable. In accordance with an embodiment, the productivity applications 30 may also be configured to create static renditions of electronic documents.

The conversion servers 70 may further be configured, during the publication process, to send the static renditions of the electronic documents to the content delivery servers 90. It should be understood, than in accordance with various embodiments, the conversion servers 70 may comprise multiple physical server computers distributed throughout the network 4 or alternatively, a single physical server comprising multiple virtual machines.

In accordance with various embodiments, the conversion application 60 may be configured to create static documents by converting electronic documents (such as the static word processing application documents 62) into the Portable Network Graphics ("PNG") format for viewing as Hypertext Markup Language ("HTML") pages. In accordance with another embodiment, the conversion application 60 may be configured to convert electronic documents into an extensible markup language ("XML") file format. An example of an XML file format which may be utilized by the conversion application 60 is the Extensible Application Markup Language ("XAML") format developed by MICROSOFT CORPORATION. It should be appreciated by those skilled in the art, that XAML formatted files may be viewed as HTML pages utilizing a browser plug-in. An illustrative browser plug-in is the SILVERLIGHT browser plug-in from MICROSOFT CORPORATION. It should be understood by that in accordance with various embodiments, the conversion application 60 is not limited to the aforementioned file formats but may also be utilized to produce any number of other file formats for displaying electronic documents.

In accordance with various embodiments, the conversion application 60 may be also configured to convert electronic documents during server pre-processing operations (i.e., during the publication of the electronic documents to the conversion servers 70), to create dynamic (i.e., editable) renditions of electronic documents such as dynamic note-taking application documents 68. The conversion application 60 may also be configured to create viewing applications 74 during server pre-processing operations (i.e., during the publication of the electronic documents to the conversion servers 70) and send the viewing applications 74 to the content delivery servers 90, so that the static renditions may be viewed in as HTML pages in a web browser (such as the web browser 38). In accordance with various embodiments, the viewing applications may be configured to display static renditions of electronic documents as HTML pages in a full screen window generated in a web browser, in a standard or normal web browser window (i.e., less than a full screen window), or as an embedded object in a web page viewable in a web browser. For example, the viewing applications 74 may be configured to embed a viewer for viewing a presentation application document as an object in a web page hosted by a news website. It should be understood that that viewing applications 74 are not limited to web browser applications but rather may include any application capable of consuming a static resource. For example, the viewing applications 74 may include an application which generates a preview window for viewing electronic documents. The preview window may be utilized to display static renditions of electronic documents thereby increasing the speed of loading the electronic document for viewing by the application. It should be appreciated that, in accordance an embodiment, the viewing applications 74 may comprise a separate viewing application for the static word processing application documents 62, the static presentation application documents 64, the static spreadsheet application documents 65, and the static note-taking application documents 66.

The content delivery servers 90 may be utilized to host the static word processing application documents 62, the static presentation documents 64, the static spreadsheet application documents 65, the static note-taking application documents 66, and the viewing applications 74, after they have been created by the conversion application 60 and sent from the conversion servers 70 during the publication process. In accordance with various embodiments, the content delivery severs 90 may be utilized to deliver static electronic documents and their associated viewing applications to one or more requesting client computers (such as the client computer 2) over the network 4. It should be understood that, in accordance with an embodiment, the content delivery servers 90 may comprise a network including a plurality of scalable Internet servers which may be utilized for hosting high traffic websites and rapidly deploy static files to web browsers.

It should be understood that the network architecture of FIG. 1 and its components include functionality to communicate with other computing devices, communication devices, and/or other systems and are not intended to be limited to the embodiments and examples described herein.

Exemplary Operating Environment

Figure 2:
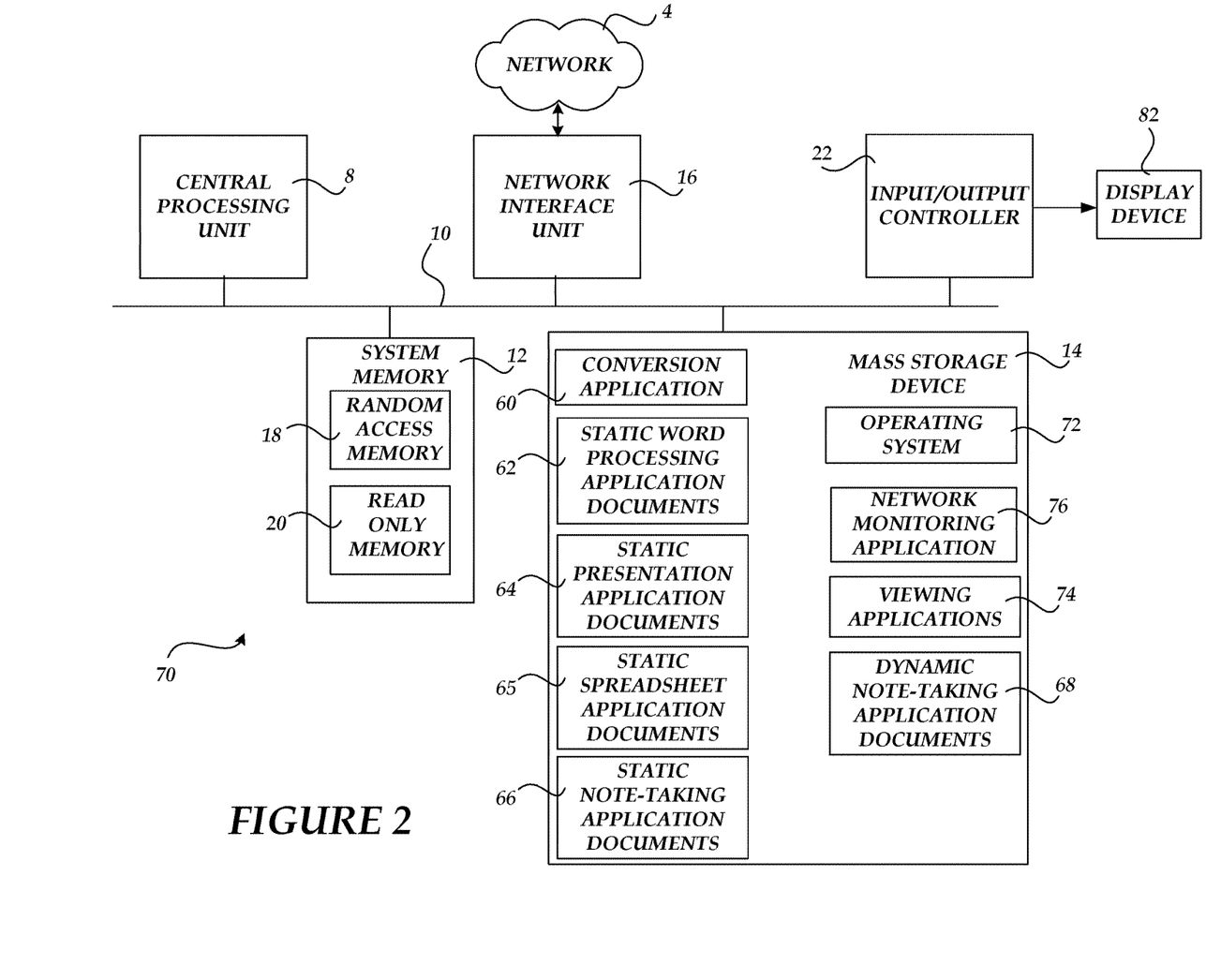
FIG. 2 is a block diagram illustrating a server computing environment for utilizing server pre-processing to deploy static renditions of electronic documents in a computer network, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows a conversion server 70 which may include a general purpose desktop, laptop, handheld, tablet, or other type of computer capable of executing one or more application programs. The conversion server 70 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The conversion server 70 further includes a mass storage device 14 for storing an operating system 72, the static word processing application documents 62, the static presentation documents 64, the static spreadsheet application documents 65, the static note-taking application documents 66, the dynamic note-taking application documents 68, and the viewing applications 74 described above with respect to FIG. 1. The conversion server 70 may also include a network monitoring application 76 for monitoring network resources to determine a current server load (i.e., demand) for an electronic document.

In accordance with various embodiments, the operating system 32 may be suitable for controlling the operation of a networked personal computer, such as the WINDOWS SERVER operating system incorporating SHAREPOINT services technology from MICROSOFT CORPORATION. As is known to those skilled in the art, SHAREPOINT services technology enables users to create, maintain, and present a collaborative environment to share information. Using the technology, a user or organization can create one or more websites to provide and share information (e.g., documents on a web server or web folder, etc.) for other users associated with the websites. It should be understood that the embodiments described herein should not be construed as being limited to SHAREPOINT services technology and that other collaborative services technology from other developers and/or manufacturers may also be utilized.

The mass storage device 14 is connected to the CPU 8 through a mass storage controller (not shown) connected to the bus 10. The mass storage device 14 and its associated computer-readable media provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed or utilized by the conversion server 70. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the conversion server 70. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments, the conversion server 70 may operate in a networked environment using logical connections to remote computers through the network 4 which may comprise, for example, a local network or a wide area network (e.g., the Internet). The conversion server 70 may connect to the network 4 through a network interface unit 16 connected to the bus 10. It should be appreciated that the network interface unit 16 may also be utilized to connect to other types of networks and remote computing systems. The conversion server 70 may also include an input/output controller 22 for receiving and processing input from a number of input types, including a keyboard, mouse, pen, stylus, finger, and/or other means. Similarly, an input/output controller 22 may provide output to a display device 82, a printer, or other type of output device. Additionally, a touch screen can serve as an input and an output mechanism. It should be appreciated that the client computer 2 and the content delivery servers 90 shown in FIG. 1 may include many of the conventional components shown with respect to the conversion server 70 in FIG. 2.

Figure 3:
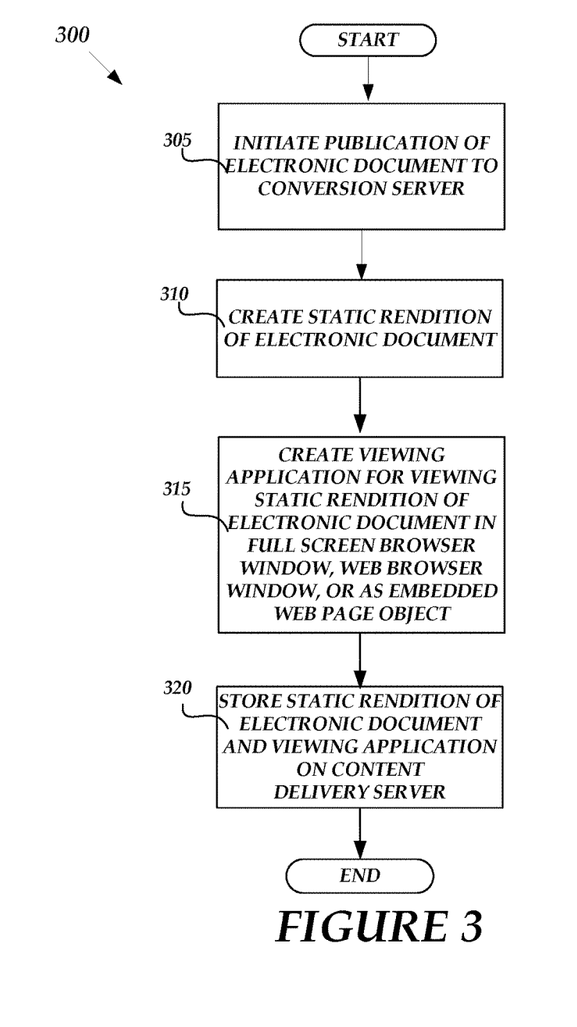
FIG. 3 is a flow diagram illustrating a routine for utilizing server pre-processing to deploy static renditions of electronic documents in a computer network, in accordance with an embodiment.

FIG. 3 is a flow diagram illustrating a routine 300 for utilizing server pre-processing to deploy static renditions of electronic documents in a computer network, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-4 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the publication of an electronic document (e.g., one of the word processing application documents 32, the presentation application documents 34, or the spreadsheet application documents 35) is initiated to the conversion server 70. In accordance with an embodiment, publication may be initiated manually by receiving a request from a user of the productivity applications 30 executing on the client computer 2, wishing to publish an electronic document by sending the electronic document to the server for eventual hosting by the content delivery server 90. As will be described in greater detail below, the publication of the electronic document may be implemented by both a conversion server 70 and the content delivery server 90. In accordance with another embodiment, publication of an electronic document may be initiated automatically by the conversion application 60 executing on a conversion server 70 based on a determination by the network monitoring application 76 executing on a conversion server 70 that a current demand for the electronic document has increased the network traffic load for the conversion server above a threshold. Thus, if the network monitoring application 76 determines that an electronic document is under a heavy load (i.e., there is a high demand for the electronic document), the conversion application 60 may automatically initiate publication of the electronic document on the client computer 2 which is causing the demand in order to reduce the load on a conversion server 70. It should be understood that the utilization of a network traffic load threshold is but one of a number of "triggers" which may be utilized by the conversion application 60 to automatically initiate the publication of an electronic document. For example, and as will be discussed in greater detail below with respect to FIG. 4, the publication of an electronic document may also be automatically initiated (i.e., triggered) by the conversion application 60 when publishing the dynamic version of an electronic document in response to the revisions made on the client computer 2.

From operation 305, the routine 300 continues to operation 310 where the conversion application 60 executing on a conversion server 70 carries out server pre-processing operations, which include continuing the publication process for the electronic document initiated by the client computer 2 (or by a conversion server 70), by creating a static rendition of the electronic document to be published. In particular, the conversion application 60 may be configured to convert one of the word processing application document 32, the presentation application documents 34, or the spreadsheet application documents 35 into static HTML files (i.e., a static word processing application document 62, a static presentation application document 64, or a static spreadsheet application document 65). For example, the conversion application 60 may be configured to create a static word processing application document 62 by converting one of the word processing application documents 32 into a PNG or XAML formatted HTML page.

From operation 310, the routine 300 continues to operation 315 where the conversion application 60 executing on the conversion server 70 continues to carry out server pre-processing operations, which include continuing the publication process for the electronic document initiated by the client computer 2 (or by a conversion server 70), to create a viewing application 74 for viewing a static rendition of the electronic document in either a full screen web browser, in a standard web browser window, or as an embedded web object. For example, a viewing application 74 may be comprise a viewer for reading the static word procession application documents 62 as full screen documents in a browser window generated by the web browser 38 on the client computer 2. Alternatively, a viewing application 74 may comprise an embedded object for viewing the static presentation application documents 64 in a website (hosted by the content delivery server 90) accessed by the web browser 38 on the client computer 2.

From operation 315, the routine 300 continues to operation 320 where the conversion application 60 executing on the conversion server 70 finishes server pre-processing operations and the publication process for the electronic document initiated by the client computer 2 (or by a conversion server 70), by storing the created static rendition of the electronic document and the created viewing application on the content delivery server 90 which may both be deployed to a requesting client computer for viewing using a web browser. From operation 320, the routine 300 then ends.

Figure 4:
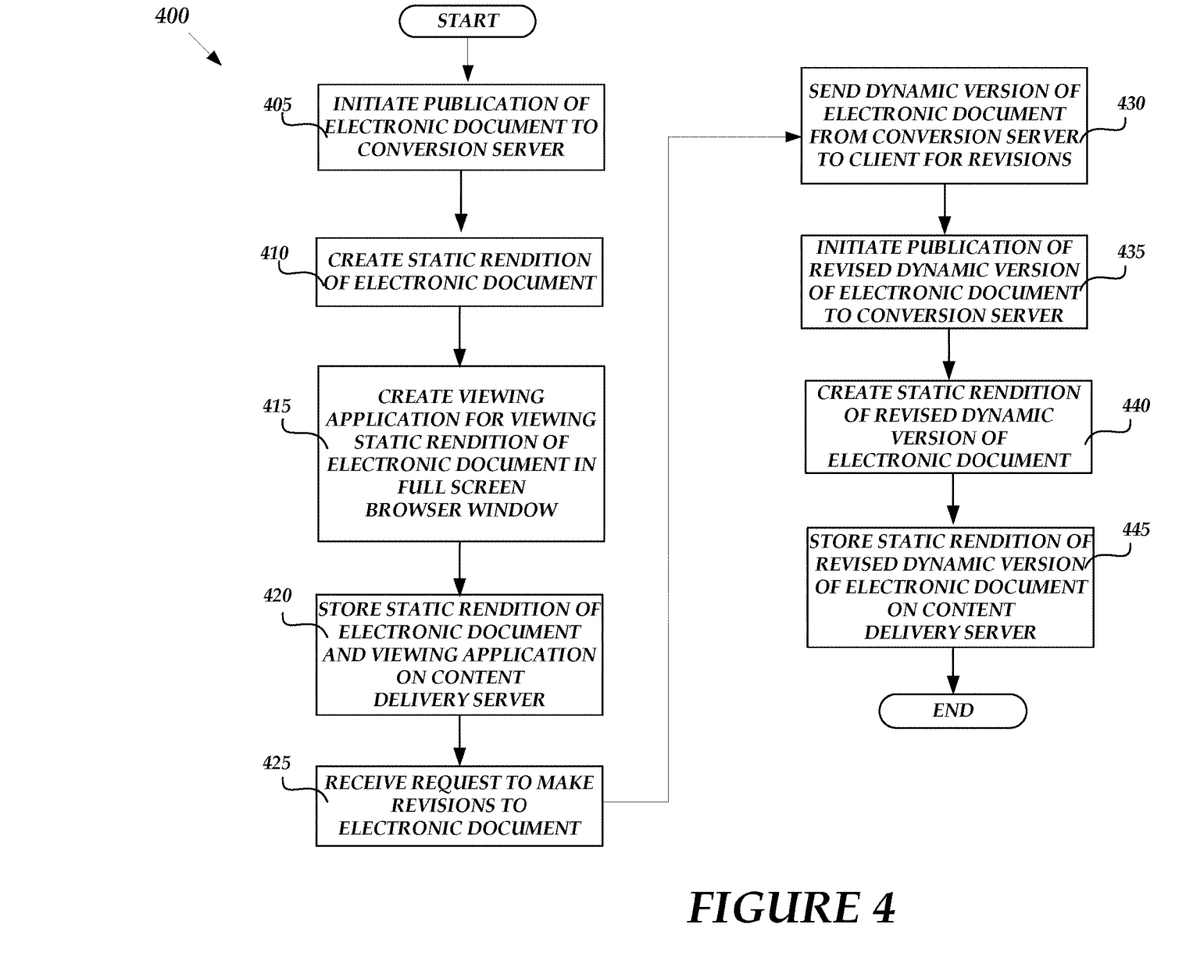
FIG. 4 is a flow diagram illustrating a routine for utilizing server pre-processing to deploy static renditions of electronic documents in a computer network, in accordance with another embodiment.

FIG. 4 is a flow diagram illustrating a routine 400 for utilizing server pre-processing to deploy static renditions of electronic documents in a computer network, in accordance with another embodiment. The routine 400 begins at operation 405, where publication of the note-taking application documents 36 is initiated to the conversion server 70. In accordance with an embodiment, publication may be initiated manually by receiving a request from a user of the productivity applications 30 executing on the client computer 2, wishing to publish an electronic document by sending the electronic document to the server for eventual hosting by the content delivery server 90. As will be described in greater detail below, the publication of the electronic document may be implemented by both a conversion server 70 and the content delivery server 90. In accordance with another embodiment, publication of an electronic document may be initiated automatically by the conversion application 60 executing on a conversion server 70 based on a determination by the network monitoring application 76 executing on a conversion server 70 that a current demand for the electronic document has increased the network traffic load for the conversion server above a threshold. Thus, if the network monitoring application 76 determines that an electronic document is under a heavy load (i.e., there is a high demand for the electronic document), the conversion application 60 may automatically initiate publication of the electronic document on the client computer 2 which is causing the demand in order to reduce the load on a conversion server 70.

From operation 405, the routine 400 continues to operation 410 where the conversion application 60 executing on the conversion server 70 carries out server pre-processing operations, which include continuing the publication process for the electronic document, initiated by the client computer 2 (or by a conversion server 70), by creating static and dynamic (i.e., editable) renditions of the electronic document to be published. In particular, the conversion application 60 may be configured to convert one of the note-taking application documents 36 into a static a HTML file (i.e., a static note-taking application document 66) or into an editable version of a note-taking application document 66.

From operation 410, the routine 400 continues to operation 415 where the conversion application 60 executing on a conversion server 70 continues carrying out server pre-processing operations, which include continuing the publication process for the electronic document initiated by the client computer 2 (or by a conversion server 70), to create a viewing application 74 for viewing a static rendition of the electronic document in a full screen web browser. For example, a viewing application 74 may be comprise a viewer for reading the static note-taking application documents 66 as full screen documents in a browser window generated by the web browser 38 on the client computer 2. In accordance with various embodiments, the static rendition of the electronic document may appear to be identical to the dynamic rendition of the electronic document, when the static rendition is being viewed using one of the viewing applications 74.

From operation 415, the routine 400 continues to operation 420 where the conversion application 60 executing on a conversion server 70 finishes server pre-processing operations and the publication process for the electronic document initiated on the client computer 2, by storing the created static rendition of the electronic document and the created viewing application on the content delivery server 90 which may both be deployed to a requesting client computer for viewing using a web browser.

From operation 420, the routine 400 continues to operation 425 where the conversion application 60, executing on a conversion server 70, receives a request from a user of the productivity applications 30, executing on the client computer 2, to make revisions to a published electronic document. From operation 425, the routine 400 continues to operation 430 where the conversion application 60 executing on a conversion server 70 sends the dynamic version of the electronic document to the client computer 2 for revisions. It should be understood that in accordance with an embodiment, the dynamic version of the electronic document may be sent to the client computer 2 by the client computer 2 utilizing a background process to download the dynamic version of the electronic document from the conversion server 70 while the static version of the electronic document is being viewed in a viewing application 74.

From operation 430, the routine 400 continues to operation 435 where the conversion application 60, executing on a conversion server 70, initiates publication of the dynamic version of the electronic document in response to the revisions made to the published electronic document on the client computer 2 at operation 425 (i.e., the revised dynamic version of the electronic document). In accordance with an embodiment, the publication of the dynamic version of the electronic document may be automatically initiated.

From operation 435, the routine 400 continues to operation 440 where the conversion application 60 executing on the conversion server 70 carries out server pre-processing operations, which include continuing the publication process for the revised dynamic version of the electronic document by creating a static rendition of the revised dynamic electronic document. From operation 440, the routine 400 continues to operation 445 where the conversion application 60 executing on the conversion server 70 finishes server pre-processing operations and the publication process for the revised dynamic version of the electronic document by storing the created static rendition of the electronic document on the content delivery server 90 for deployment to a requesting client computer for viewing using a web browser. From operation 445, the routine 400 then ends.

Figure 5:
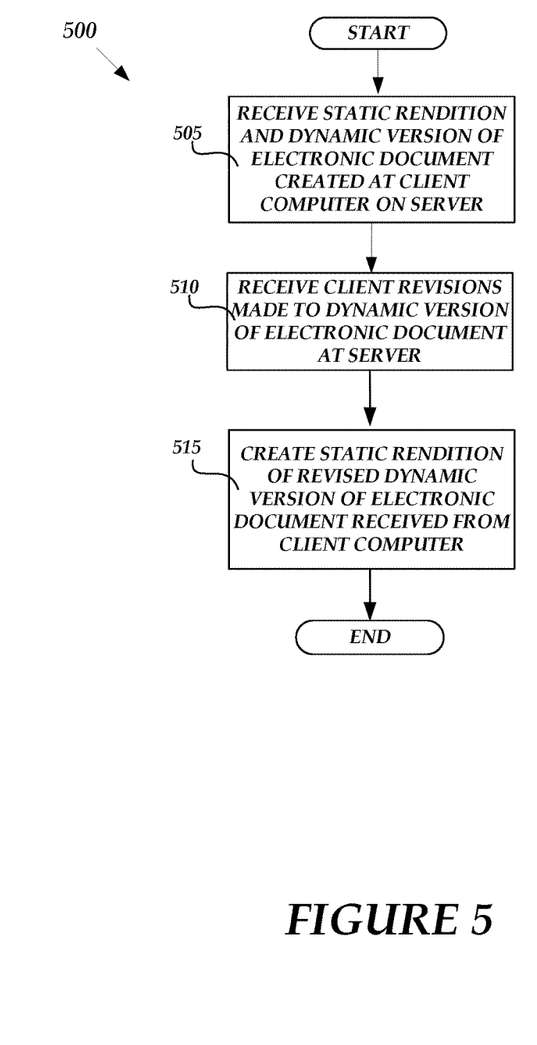
FIG. 5 is a flow diagram illustrating a routine for utilizing server pre-processing to deploy static renditions of electronic documents in a computer network, in accordance with another embodiment.

FIG. 5 is a flow diagram illustrating a routine 500 for utilizing server pre-processing to deploy static renditions of electronic documents in a computer network, in accordance with another embodiment. The routine 500 begins at operation 505, where a static rendition and a dynamic version of an electronic document created by the productivity applications 30 are received at the conversion server 70. As discussed above, the productivity applications 30 may be utilized to create static renditions of electronic documents. For example, the productivity applications 30 executing on the client computer 2 may be utilized to create an editable word processing document (i.e., the dynamic version) as well as an XAML version of the word processing document (i.e., the static version) which may then be uploaded to the conversion server 70. It should be understood that, in accordance with an embodiment, the static version of the electronic document may be pre-generated by the productivity applications 30 prior to being uploaded to the conversion server 70.

From operation 505, the routine 500 continues to operation 510 where the conversion server 70 receives revisions to the dynamic version of the electronic document (thereby creating a revised dynamic version of the electronic document) made from the client computer. From operation 510, the routine 500 continues to operation 515 where the conversion application 60 executing on the conversion server 70 creates a static rendition of the revised dynamic version of the electronic document received from the client computer 2. Thus, in accordance with the aforementioned embodiment, the conversion application 60 may conserve processing resources on the conversion server 70 by only creating static documents from revised or edited electronic documents. From operation 515 the routine 500 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of deploying static renditions of electronic documents in a computer network, the method comprising:
receiving a first request for an electronic document;
providing, in response to the first request, a first rendition of the electronic document;
determining that a current demand for the electronic document has increased;
in response to determining that the current demand for the electronic document has increased, making the electronic document accessible to one or more client computers by:
creating an uneditable static rendition of the electronic document from an editable rendition of the electronic document, wherein the uneditable static rendition is different than the first rendition of the electronic document,
creating a viewing application for viewing the uneditable static rendition of the electronic document, and
storing the uneditable static rendition of the electronic document and the viewing application for delivery to a client computer of the one or more client computers; and
providing, in response to a second request for the electronic document, the uneditable static rendition of the electronic document.

2. The method of claim 1, wherein the uneditable static rendition is one that displays content of the electronic document in an uneditable form and requires fewer resources to display the uneditable form of the electronic document as compared to the first rendition of the electronic document.

3. The method of claim 1, wherein determining that the current demand for the electronic document has increased includes determining that the current demand for the electronic document has increased a network traffic load above a threshold.

4. The method of claim 3, further comprising:
responsive to the determination that the current demand for the electronic document has increased the network traffic load above the threshold, initiating a publication of the electronic document at another client computer of the one or more client computers instead of publishing the electronic document by sending the electronic document to a second server computer in the computer network for hosting.

5. The method of claim 4, wherein the initiating the publication of the electronic document to the other client computer includes receiving a request to publish the electronic document.

6. The method of claim 4, wherein the initiating the publication of the electronic document includes initiating the publication of at least one of a word processing application document, a presentation application document, or a spreadsheet application document.

7. The method of claim 1, wherein creating the viewing application for viewing the uneditable static rendition of the electronic document includes configuring the viewing application to embed a viewer to view the uneditable static rendition of the electronic document as an object in a web page hosted by a website.

8. The method of claim 1, wherein making the electronic document accessible to the one or more client computers includes making the electronic document accessible to at least the client computer and another client computer of the one or more client computers.

9. A method of utilizing server pre-processing to deploy an uneditable static rendition of electronic documents in a computer network, comprising:
receiving a first request for an electronic document;
providing, in response to the first request, a dynamic rendition of the electronic document;
determining that a current demand for the electronic document has increased;
in response to the determination that the current demand for the electronic document has increased, generating an uneditable static rendition of the electronic document; and
providing, in response to a second request for the electronic document, the uneditable static rendition of the electronic document.

10. The method of claim 9, wherein the uneditable static rendition is one that displays content of the electronic document in an uneditable form and requires fewer resources to display the uneditable form of the electronic document as compared to the dynamic rendition of the electronic document.

11. The method of claim 9, wherein determining that demand for the electronic document has increased includes determining that a network traffic load associated with the electronic document has increased above a threshold.

12. The method of claim 11, further comprising:
responsive to the determination that the network traffic load associated with the electronic document is above the threshold, sending the electronic document to a second server computer in the computer network for hosting.

13. The method of claim 9, further comprising:
receiving a request to make revisions to the electronic document; and
providing, to a first client computer, the dynamic rendition of the electronic document for making the revisions to the electronic document while the uneditable static rendition of the electronic document is being viewed in a viewing application on a second client computer.

14. The method of claim 9, wherein generating the uneditable static rendition of the electronic document comprises creating a viewing application for presenting the uneditable static rendition of the electronic document as appearing to be the same as the dynamic rendition of the electronic document.

15. The method of claim 9, wherein generating the uneditable static rendition of the electronic document comprises receiving a request to publish the electronic document.

16. A storage medium comprising computer executable instructions which, when executed on a computer, cause the computer to perform a method of utilizing server pre-processing to deploy uneditable static renditions of electronic documents in a computer network, the method comprising:
receiving an uneditable static rendition of an electronic document and a dynamic version of the electronic document;
receiving a first request for the electronic document;
providing, in response to the first request, the dynamic version of the electronic document;
determining that a current demand for the electronic document has increased;
in response to the determination that the current demand for the electronic document has increased, initiating a publication of the electronic document by configuring a viewing application to embed a viewer to view the uneditable static rendition of the electronic document as an object in a web page hosted by a website;

providing, in response to a second request for the electronic document, the web page hosted by the website;

receiving revisions to the dynamic version of the electronic document; and creating an uneditable static rendition of a revised dynamic electronic document, wherein the uneditable static rendition of the electronic document is created by converting an editable rendition of the electronic document to an uneditable rendition of the electronic document.

17. The storage medium of claim 16, wherein the uneditable static rendition is one that displays content of the electronic document in an uneditable form and requires fewer resources to display the uneditable rendition of the electronic document as compared to the dynamic version of the electronic document.

18. The storage medium of claim 16, wherein determining that the current demand for the electronic document has increased includes determining that the current demand for the electronic document has increased a network traffic load above a threshold.

19. The storage medium of claim 18, further comprising: responsive to the determination that the current demand for the electronic document has increased the network traffic load above the threshold, initiating the publication of the electronic document at a client computer instead of publishing the electronic document by sending the electronic document to a second server computer in the computer network for hosting.

20. The storage medium of claim 16, wherein the uneditable static rendition of the electronic document and the dynamic version of the electronic document are received from a client computer, and the receiving comprises receiving an uneditable static rendition of a word processing application document and a dynamic rendition of the word processing application document.

* * * * *